March 2, 1954
W. H. EVANS
2,670,635
LINE REAMING AND BORING MACHINE
Filed Sept. 15, 1951
3 Sheets-Sheet 1
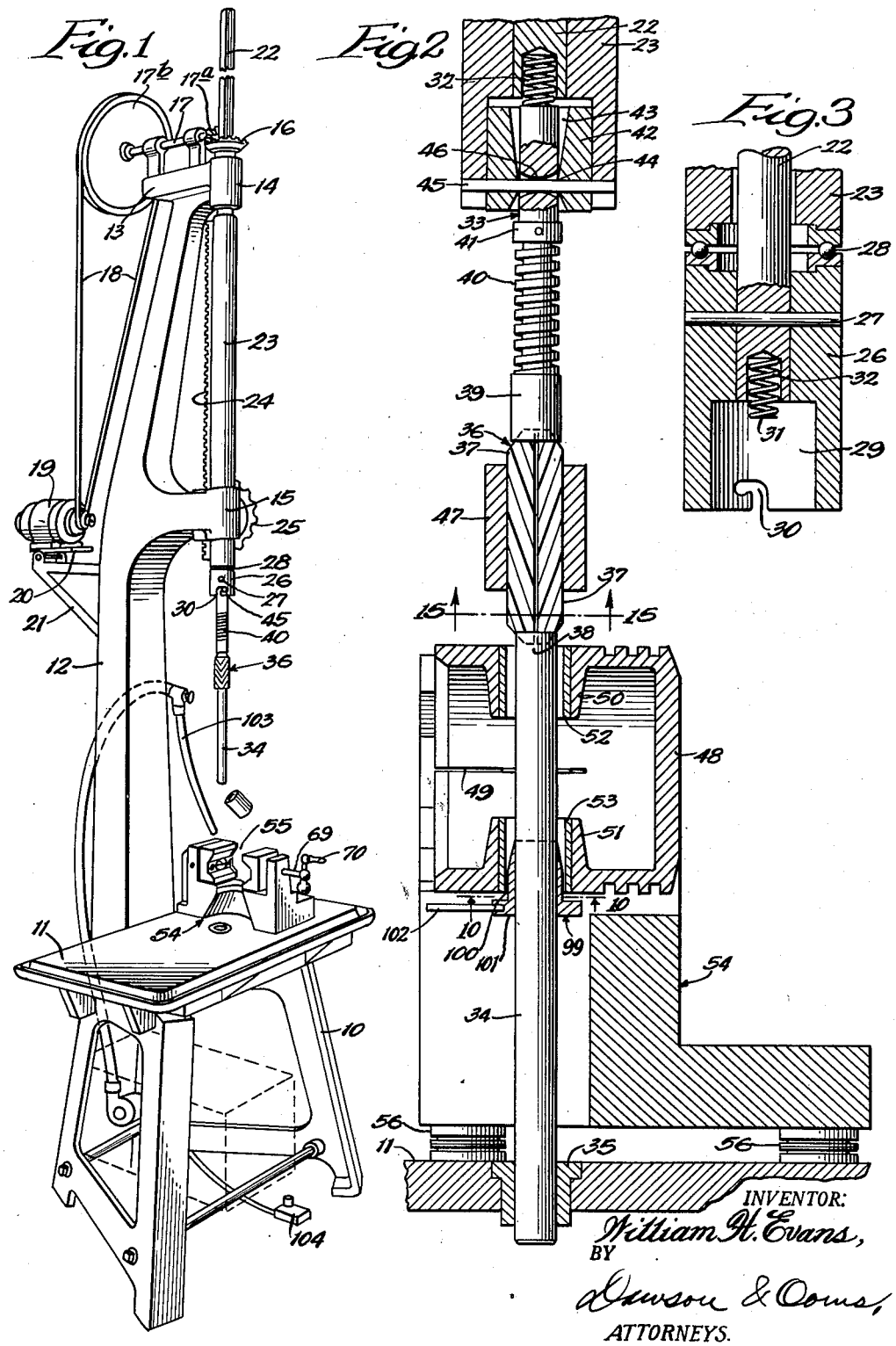
INVENTOR:
William H. Evans,
BY
Dawson & Ooms,
ATTORNEYS.

March 2, 1954 W. H. EVANS 2,670,635
LINE REAMING AND BORING MACHINE
Filed Sept. 15, 1951 3 Sheets-Sheet 2
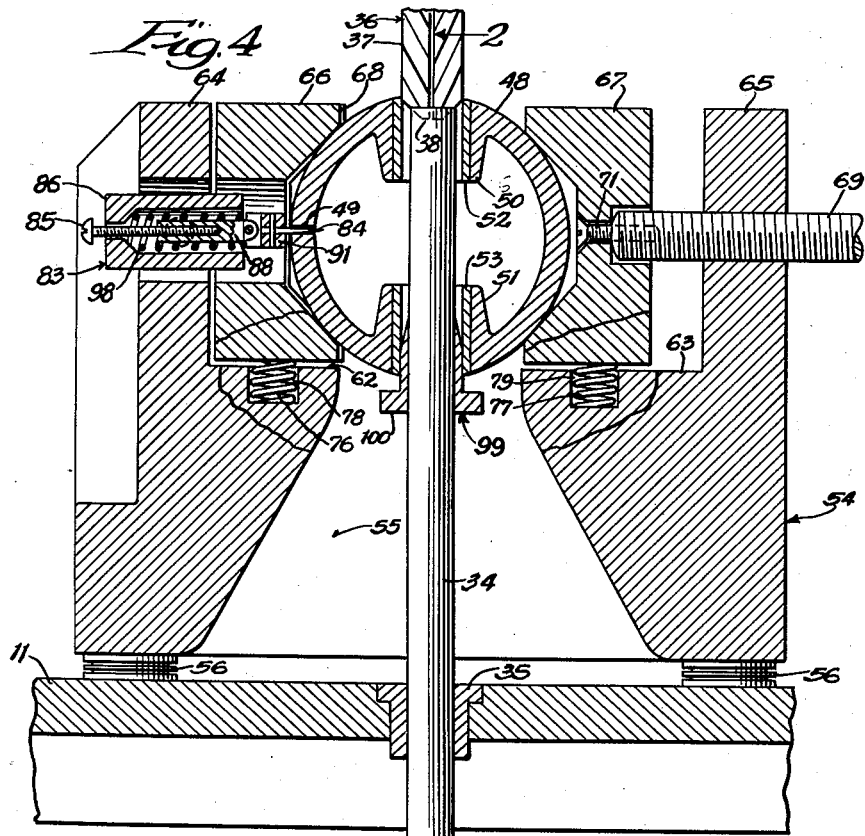
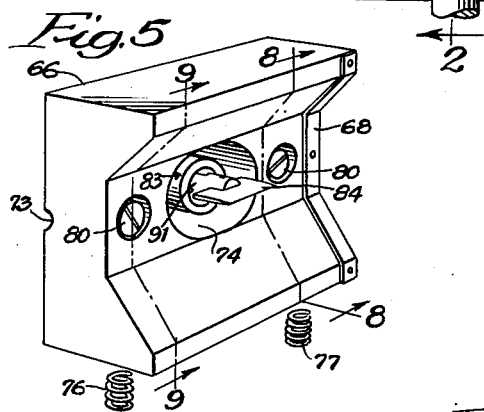
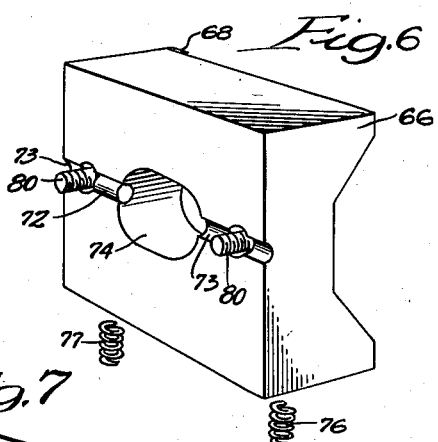
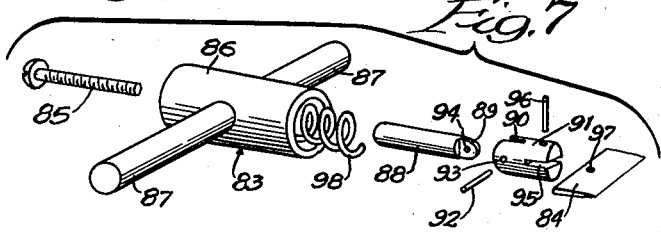
INVENTOR:
William H. Evans,
BY
Dawson & Orms,
ATTORNEYS.

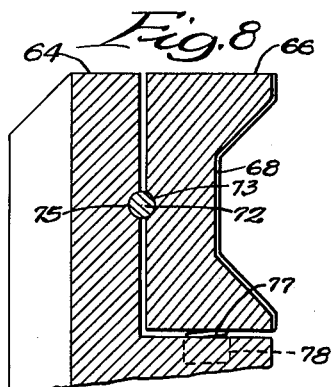
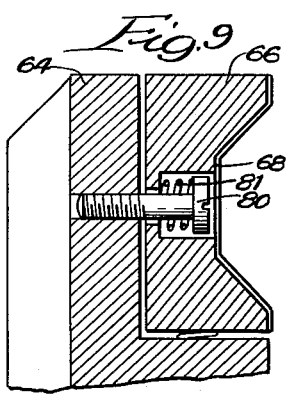
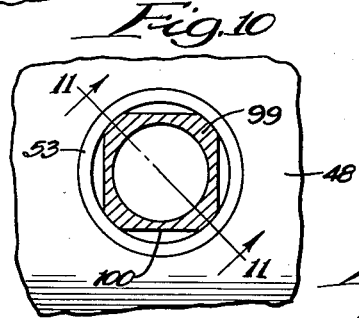
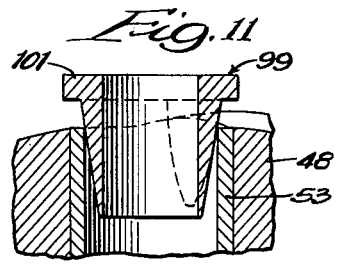
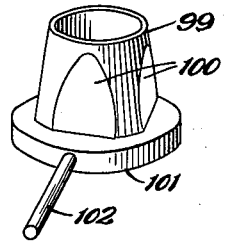
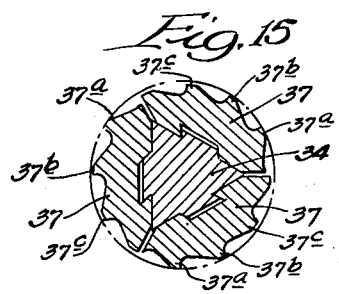
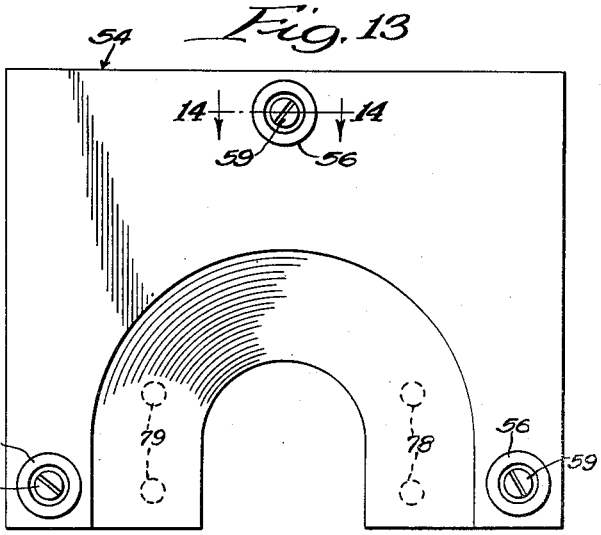
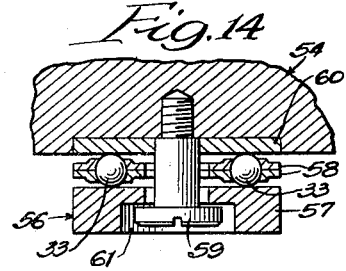

Patented Mar. 2, 1954

2,670,635

UNITED STATES PATENT OFFICE 2,670,635

LINE REAMING AND BORING MACHINE

William H. Evans, Miami Beach, Fla.

Application September 15, 1951, Serial No. 246,814

6 Claims. (Cl. 77—4)

This invention relates to reaming and boring apparatus and is particularly useful in the reaming of automobile piston bearings.

The present case is a continuation-in-part of my co-pending applications Serial No. 141,809, filed February 1, 1950, for Line Reaming and Boring Machine, now Patent No. 2,584,005, and Serial No. 200,555, filed December 13, 1950, for Jig for Line Reaming and Boring Machine, now Patent No. 2,614,443.

In the overhauling of internal combustion engines, it is usually necessary to replace or repair the upper connecting rod bearings and in this connection it is common to replace wrist-pins which are 3 or $5/1000$ths oversize. In this operation it is necessary to ream the bearings in the piston in which the wrist-pin is supported as well as the upper connecting rod bearing which engages the central portion of the wrist-pin.

The bearings in the piston bosses require accurate reaming because they are frequently elongated and distorted due to a twisting of the connecting rod. Such twisting is caused by the reduction of strain in the metal itself.

In rebuilding operations of the type discussed, the pistons are frequently reamed in such a way that the holes on the two sides of the skirt are not in alignment. When the piston bearings are reamed by following the old openings and the wrist-pin is then fitted into the piston and upper connecting rod bearing, it is usually found that the main bearing at the bottom of the connecting rod is out of line with the connecting rod, and it is then necessary to twist and bend the connecting rod to obtain a proper alignment. As a result, the strain thus introduced into the connecting rod is relieved after some miles of operation and the piston is caused to bear more tightly against one side of the cylinder than the other, with the result that out-of-round cylinder bores and piston slap and other undesirable results follow.

Automobile factories spend large sums of money every year taking strains out of castings and metal before building automobile engines. Due to the need for high production, the time for such operations is limited and only about 80% of the strains are eliminated, the remaining 20% being released later in the operation of the engine when heating up and cooling off. During this latter operation, the connecting rod twists and tilts the pistons so that the rings are also tilted and wear barrel face to provide spaces through which oil may escape and also causing a reduction in compression.

In the practice described above of fitting oversized wrist-pins, it has been common to follow the old worn hole in the piston, then to put the rod in a straining fixture to bend the rod back into line. However, within a few days the new strains created by such bending in attempting to straighten the rod begin to release and the rings of the piston no longer lie flat against the wall of the cylinder. Thus the same trouble starts over again.

An object of the present invention is to provide reaming apparatus in which pistons may be accurately reamed without causing a distortion of the bearing portions being reamed due to the slot in the skirt of the piston. Yet another object is to provide reaming apparatus by which pistons, etc. are accurately secured in position for reaming and by which the reaming for both holes is accomplished in a minimum of time. A still further object is to provide means for accurately centering the piston with respect to the reamer shaft while at the same time supporting the piston in such a manner as to prevent distortion of the piston skirt. Yet another object is to provide novel centering means for pistons, connecting rod bearings, etc. by which the bearings of such structures are accurately centered with the reamer shaft prior to the reaming operation and in a minimum of time.

It is a still further object of my invention to provide means in my line reaming and boring machine for preventing the spindle vibrations from being transferred to the reamer while it is engaging the work piece, and to prevent the vibrations in the bed supporting the work holder from being transferred to the work holder during a reaming operation, whereby the cutting edges of the reamer can be kept sharp over prolonged periods of use.

More specifically it is an object of my invention to provide a jig or work holder for use in my line reaming and boring machine which will have a substantially floating action on its supporting bed to dampen the transfer of vibrations to the work holder. Further, it is an object of my invention to suspend the reamer mandrel from the reamer chuck by a universal joint to dampen the transfer of vibrations from the chuck to the mandrel.

It is another object of my invention to adapt the work holder and reamer so that they cooperate in a novel way to produce a perfectly round hole even though the hole being reamed is oval-shaped or has become otherwise distorted. More specifically in this connection, it is an object of my invention to employ a reamer having one of its cutting edges at a slightly greater radial distance from the center of the reamer mandrel than the other cutting edges in conjunction with a work holder supported on a plurality of anti-friction bearings adapted to permit lateral movements of the work holder, whereby the reamer cutting edge at the greatest radial distance from the center of the reamer mandrel serves as a boring tool and guide in shifting the work holder on the anti-friction bearings during the reaming operation to produce a perfectly round hole at all reamer speeds.

It is also an object of my invention to provide a work holder for use with my line reaming and boring machine having clamping jaws which are adapted to cooperate with the reamer to centralize the work piece within the work holder while it is being clamped therein so that the reamed holes will be in true alignment. Other objects and advantages will appear as the specification proceeds.

The invention is shown in an illustrative embodiment by the accompanying drawings, in which—

Figure 1 is a perspective view of apparatus embodying my invention; Fig. 2, an enlarged vertical sectional view showing a piston secured in position for reaming taken on line 2—2 of Fig. 4; Fig. 3, a detail sectional view of the rotatable head secured below the rack sleeve with the rack sleeve and spindle broken away, taken on the same axis as Fig. 2; Fig. 4, an enlarged vertical sectional view of the work holder with part of the clamping blocks and supporting shelves broken away to show the springs beneath the blocks, the section being taken transversely of the piston held by the work holder; Fig. 5, a perspective front view of the stationary jaw of the work holder; Fig. 6, a perspective rear view of the jaw of Fig. 5; Fig. 7, a developed view of the wedge and supporting structure therefor, the parts being shown in separate relation; Fig. 8, a detail cross sectional view of the stationary clamping jaw and adjacent portion of the work holder taken on line 8—8 of Fig. 5; Fig. 9, a detail cross sectional view similar to Fig. 8 taken on line 9—9 of Fig. 5; Fig. 10, a transverse sectional view, the section being taken as indicated at line 10—10 of Fig. 2; Fig. 11, a broken sectional detail view, the section being indicated at line 11—11 of Fig. 10; Fig. 12, a perspective view of a centering bushing or tapering guide which I prefer to employ; Fig. 13, a bottom view of the work holder; Fig. 14, a detail sectional view of one of the pedestals of the work holder taken on line 14—14 of Fig. 13; and Fig. 15, a cross sectional view of the reamer taken on line 15—15 of Fig. 2.

In the illustration given, 10 designates a frame which may be of any suitable construction, and upon it is supported a horizontal bed 11. Extending above the bed 11 is a standard 12 providing at its top a pulley wheel mounting 13. The standard 12 provides at its upper end a sleeve bearing 14 and at an intermittent point below a sleeve bearing 15. Within the bearings 14 and 15 is supported reamer apparatus including a reamer spindle, means for rotating the reamer spindle, and means for raising and lowering the reamer spindle. Mounted within bearing 14 is a gear equipped sleeve 16 and the gear thereof meshes with a gear 17a mounted on the end of shaft 17. Shaft 17 is equipped on the other end with a large pulley wheel 17b drivably connected by V-belt 18 to the 3-speed pulleys of motor 19. To provide for the adjustment of belt 18 and to maintain the tension therein motor 19 is supported on pivotally mounted platform 20, which in turn is attached to standard 12 by bracket 21. Since this structure is well-known in the art, it is not believed that it will be necessary to further describe it herein.

Keyed to the gear sleeve 16 is a reamer spindle 22 so that the shaft 22 is rotated with the gear sleeve 16 while being vertically movable relative thereto.

To raise and lower the reamer spindle, I provide a rack sleeve 23 which is slidably mounted within bearing 15, shaft 22 being rotatably anchored to the sleeve 23 for vertical movement therewith while rotating independently thereof. The rack 24 of the sleeve 23 is engaged by a gear operated by a manually-operated wheel 25. As seen more clearly in Fig. 3 spindle 22 is extended below sleeve 23 and is rigidly secured to rotatable head 26 by pin 27. Thrust bearings 28 are provided between the lower end of sleeve 23 and rotating head 26. The lower end of head 26 is recessed to provide a socket 29 adapted to act as a chuck in receiving the upper end of the reamer mandrel. Inverted hook-shaped slots 30 are provided on opposite sides of the lower end portions of the walls of socket 29. Slots 30 cooperate with spring 31 which is wedged within recess 32 in the lower end of spindle 22 to retain the upper end of the reamer mandrel within socket 29. While other reamers can be employed in my apparatus, I prefer to employ reamers constructed in accordance with the disclosure in my U. S. Patent No. 2,421,490 issued June 3, 1947, including the improvement described in my U. S. Patent No. 2,537,818 issued January 9, 1951. A reamer assembly constructed in accordance with the disclosure of these patents is shown more clearly in Fig. 2. In the illustration given, this reamer assembly comprises a solid mandrel 33 having its lower portion provided with a smooth extension 34 adapted to extend through a bearing 35 in bed 11. Above the smooth extension is a reamer 36 having three cutting segments 37 symmetrically positioned about and interlocked with a triangular core portion of mandrel 34, as shown more clearly in Fig. 15. The preferred means of interlocking the core and cutting segments is described in greater detail in my Patent No. 2,421,590 mentioned above. The outside surfaces of the cutting segments 37 are provided with spiral flutes 37a terminating in lands 37b to form a plurality of cutting edges 37c. In the manufacture of this expansion type of segmented reamer, it has been found practically impossible to form an assembled reamer in which all of the cutting edges are at equal radial distances from the central axis of the mandrel. Heretofore, this has been considered to be a disadvantage inherent in this type of reamer. However, I have now discovered that when this type of reamer is employed in combination with a work holder of a type which will subsequently be described that it is highly desirable to have one of the cutting edges lying at from .002 to .007 of an inch greater radial distance from the vertical axis of the reamer in that it serves as a flycutter and guide during the boring operation. This will subsequently be described in greater detail.

Reamer segments 37 can be secured against longitudinal movement with respect to mandrel 34 by any suitable means. In the illustration given, an annular notch is provided in mandrel 34 adapted to receive the tapered lower ends of reamer segments 37, as indicated at 38 in Figs. 2 and 4. The upper ends of the cutting segments can be clamped beneath a slidably mounted retainer 39, which can be backed by a compression spring 40. An adjustment nut 41 can be used to regulate the compression in spring 40.

Mandrel 24 can be secured in a number of ways to spindle 22 so that it will be constrained to rotate therewith. However, I prefer to interpose between reamer 36 and spindle 22 a universal joint adapted to limit the transfer of vibrations, and particularly vibrations in horizontal planes, from spindle 22 and the members in proximity to spindle 22 to reamer 36. My reason for wishing to dampen the transfer of vibrations from the upper structural members of my apparatus to reamer 36 involves my discovery of a prime cause of reamers becoming rapidly dulled by use. Reamers of the type which I prefer to employ have feather-like cutting edges composed of very hard metal. Through my experiments I find the cause of reamers getting dull is due to vibration. Vibration flakes off the cutting edge of the reamer which leaves a small flat surface that starts to generate heat from friction, as this surface gets wider the heat increases and in a short time the reamer needs resharpening. The sharper the reamer is, the less heat it generates. At the present time all work is held in the hand while reaming. This is the first reason for vibration. By designing a machine that holds all work solid, while having your reamer and work holder or jig floating, I eliminate substantially all vibration. This has all been proven by doing ten times more reaming on my machine without resharpening the blades than the old way of holding the work by hand with the same reamer.

As previously indicated, I prefer to interpose a universal joint between the reamer and the spindle to limit the downward transfer of vibrations. I have found it convenient to suspend the mandrel from the spindle by a universal joint. In the illustration given, this is accomplished by securing a collar 42 to the upper end of mandrel 33 by means permitting the mandrel to move laterally or execute limited amplitude movements within collar 42. In the illustration given, collar 42 is provided with an opening 43 and tapering inwardly from both ends to form a narrow ring of reduced diameter at 44. We would prefer to have the diameter at 44 just slightly greater than the diameter of the head of mandrel 33 so that the mandrel will be prevented from shifting horizontally on pin 45 which extends through collar 42 and mandrel 33 and projects outwardly on each side of collar 45. As indicated at 46 the portions of mandrel 33 in contact with pin 45 are rounded to cooperate with the inwardly tapered sides of recess 43 in providing a universal joint. It will be understood of course that other types of universal joints can be employed.

A reamer assembly can be secured to rotatable head 26 by inserting collar 42 within recess 29 and maneuvering the projecting ends of pins 45 through slots 30 while pressing upwardly against spring 32 until the outer ends of pin 45 are seated in the upper portions of the slots. A similar method is followed in detaching the reamer.

A reamer gauge 47 may be slipped over the smooth extension 34 and about the reamer 36, as shown in Fig. 2, in order to insure a reamer of the desired diameter; however, the gauge 47 is removed from the reamer prior to the reaming operation.

A typical piston is indicated by the numeral 48 in Figs. 2 and 4. The skirt of the piston is shown provided with a slot or split 49. Piston 48 has upper and lower bosses 50 and 51, and within the bosses are the wrist pin bearings 52 and 53.

In order to support the piston accurately, I provide a work holder 54 which may consist of a single member providing a recess through which the reamer mandrel may extend. In the specific illustration given, I provide a casting having a U-shaped opening 55 therethrough adapted to receive the reamer. It will be apparent, however, that work holder 54 need not be integrally formed, but rather can be composed of several parts.

I have found that reaming operations with my apparatus are greatly improved by supporting work holder 54 on a plurality of anti-friction or thrust bearings which are adapted to permit limited movement of the work holder through planes perpendicular to the reamer with a minimum of friction. As indicated above, in order to conserve the cutting edges of the reamer and to prevent these edges from becoming dulled it is desired to prevent vibrations from being transferred to the reamer from other parts of the apparatus. I have already discussed the means of preventing the vibrations from being transferred from the spindle and the upper portions of the apparatus to the reamer. It will be apparent, however, that not only is it important to prevent vibrations from being transferred to the reamer, but that it is also important to prevent vibrations from being transferred to the work piece, since vibrations in the work piece will also tend to cause flaking of the cutting edges of the reamer. This is one of the reasons why I prefer to support my work holder on thrust bearings. In this way, work holder 54 is given a floating action with respect to bed 11 so that the transfer of vibrations, and particularly horizontal vibrations, from the bed to the work holder is dampened.

Another important result of supporting work holder 54 on a plurality of thrust bearings is that the work piece therein is thus permitted to follow the motion of the reamer. This prevents the reamer from cutting a larger hole than desired because of a variation in the trueness of the reamer. Long reamers, such as I prefer to employ, tend to run out from 5 to 10 thousandths of an inch from the center which produces a whip while the reamer is engaged with the work piece and thereby causes the hole to be larger than desired. This tendency of the reamer to cut oversize is overcome by supporting the work holder on thrust bearings which permit the work piece to follow the slightly radial or amplitude movements of the reamer during the reaming operation.

I have also discovered that the floating action of the work holder cooperates with the reamer in still another way to produce perfectly round holes. As indicated above, I prefer to employ segmented reamers of the expansion type in which one of the cutting edges is at a greater radial distance from the reamer axis than the other cutting edges. When the work holder is supported on thrust bearings so that it can move with respect to bed 11 with substantially no friction, the cutting edge at the greatest radial distance from the central axis of the reamer acts as a guide in shifting the work holder on the thrust bearings during the reaming operation. To achieve this result, it is important that the frictional resistance to the movement of the work holder be equal in all directions. If the frictional resistance to motion in one direction is substantially greater than in another direction this will tend to produce egg-shaped holes.

In accordance with my invention, work holder 54 can be supported on thrust bearings in any suitable way so as to permit limited radial movement. I prefer, however, to incorporate the thrust bearings in support pedestals. In the illustration given, I employ pedestals 56 which are formed from support disk 57, rings 58, and screws 59, as shown more clearly in Fig. 14. Within rings 58 there are rotatably supported a plurality of balls 33 which are adapted to bear against the upper surface of disk 57 and against the under surface of bearing washers 60 which are embedded in the underside of the work holder. Clearance is provided about the shank portion of screw 59 from rings 58 and support disk 57 to permit relative motion between the parts. For a similar reason, recess 61 is made substantially larger than the head of screw 59 to permit radial movement of the head within the recess.

In the illustration given and preferably, three support pedestals 56 are fastened to the bottom surface of the work holder 54 in spaced apart relation around the periphery thereof. While more than three pedestals can be employed I prefer to limit the number of pedestals to three so that the work holder will be supported on bed 11 without tipping during the reaming operation. As can readily be appreciated, it is almost impossible to have the surface of bed 11 exactly perpendicular to the axis of the reamer, and therefore there would be a tendency of the work holder to tip if it were supported on more than three pedestals during the reaming operation.

At the top of the work holder 54 the opening 55 therethrough is enlarged to provide shelves 62 and 63, as seen more clearly in Fig. 4. In the illustration given, shelves 62 and 63 are provided at their rear with vertical walls or standards 64 and 65. On shelves 62 and 63 are mounted clamping blocks 66 and 67. These clamping blocks preferably have a V-shaped or notched front surface to assist in gripping the part to be reamed, especially when the work piece has a cylindrical shape such as an automobile piston. For clamping automobile pistons, I prefer to equip one end of blocks 66 and 67 with shims 68, as seen more clearly in Fig. 5. The shims are necessary since the crowns of pistons are of slightly smaller diameter to allow greater expansion because of the higher temperatures to which they are subjected.

Clamping block 67 is slidably mounted on shelf 35 and is centrally connected to actuating rod 69 which extends in threaded engagement through wall 65. If desired, a handle 70 can be attached to the outer end of rod 69 to assist in turning it to vary the position of block 67.

In the reaming of wrist pin bearings of automobile pistons, it is of the greatest importance for the reasons discussed above to secure the cylinder within the work holder so that the bearings will be reamed in direct alignment with each other, and with an axis exactly perpendicular to the axis of the cylinder, so that it will not be necessary to put the connecting rod in a straining fixture to twist it into line for connection to the crankshaft. I have discovered a means by which cylinders can be clamped in the desired alignment. This means involves a cooperation between the reamer and clamping blocks in centralizing the work piece within the work holder. To allow the clamping blocks to cooperate in the desired manner it is necessary that they be permitted to tilt about the horizontal axis below their normal central positions, and that they be maintained in these central positions by yieldable spring means. In the illustration given, clamping block 67 is secured to rod 69 by screw 71. In order to allow block 67 to tilt about a horizontal axis, clearance is provided between the adjacent surfaces of block 67 from screw 71 and rod 69, as shown in Fig. 4. Provision is made for the tilting of stationary block 66 by incorporating a horizontal hinge means in the rear face of block 66. In the illustration given, the rear face of block 66 is hinged to wall 64 by rods 72, as shown more clearly in Figs. 6 and 8. Rods 72 engage grooves 73 which are horizontally aligned and located on each side of oval-shaped aperture 74. The purpose of aperture 74 will subsequently be described, but it will be apparent that if aperture 74 is not desired, that grooves 73 can be made continuous and a continuous rod used to engage them. Grooved or semi-circular recesses 75 are provided in the surface of wall 64 to receive rods 72. If desired, rods 72 can be rotatably received within grooves 75. However, in order to obtain the desired hinging action it is only necessary that block 66 be permitted to turn about rods 72. It will be noted that semi-circular recesses 73 and 75 are cut so that block 66 will be held away from wall 64 by rods 72. I have found that it is desirable to have this clearance about $\tfrac{1}{16}$ to $\tfrac{1}{8}$ inch.

In order to yieldably support blocks 66 and 67 above their shelves 62 and 63 so that they can be tilted downwardly on their horizontal hinges, I provide compression springs 76 and 77 beneath the clamping blocks. In the illustration given, two springs are provided beneath each clamping block, and the springs are received within recesses 78 and 79 in shelves 62 and 63. I have found it preferable to employ springs of sufficient size to hold clamping blocks 66 and 67 in centered positions with their bottom surfaces supported at about $\tfrac{1}{16}$ to $\tfrac{1}{8}$ of an inch above shelves 62 and 63.

To prevent clamping blocks 66 from tipping away from wall 64 during periods of non-use, and also to hold blocks 66 snugly against rods 72 at all times, I provide screws 80 with their heads recessed in the front face of blocks 66 and their shanks threadedly engaging wall 64, as shown more clearly in Fig. 9. To allow block 66 to be tilted below its central position, clearance is provided between blocks 66 and screws 80, and springs 81 secured about the upper portion of the screw shanks bottoming against shoulders 82. Aperture 74 is designed to receive a plunger 83 adapted to urge a wedge tip 84 inwardly beyond the inner face of wedge-shaped block 66. Headed screw 85 is provided to check the inward movement of wedge 84 when it is not engaged in the slot 49 of a piston 48, as shown more clearly in Fig. 4. In the illustration given, plunger 83 includes a casing 86 equipped with laterally extending pins 87. The pins 87 are inside recesses in the wall 38 so as to provide a pivotal support for the plunger casing 86. Within the casing is a plunger 88 having an apertured tongue 89 at its forward end engaging a slot 90 in the head 91. A pivot pin 92 extends through transverse openings 93 in the head 91 and transverse openings 94 in tongue 89 so that the head 91 is thus pivotally supported upon the plunger 88.

The head 91 is provided at its forward end with a transverse or horizontal slot 95 for receiving the rear edge portion of wedge 84. A pin 96 extends downwardly through an opening in the front end portion of the head 91 and through an opening 97 in the wedge 84. Thus the wedge 84 is pivotally mounted upon the head 91 so as to swing in a horizontal plane thereon. A spring 98 is carried within the plunger casing 86 and normally urges the head 88 in an inner direction so as to bring the wedge within the slot 49 of the piston 48. To limit the plunger 88 and head 91 from extreme inward movement, when the piston is not in place, headed screw 95 has its inner end threadedly engaging a recess at the rear of plunger 88, as shown more clearly in Fig. 4.

With the supporting structure above described, the wedge 84 is normally urged inwardly so as to engage the split or slot in a piston, no matter what its size, while at the same time the wedge is movable in all directions and at all angles enabling it to conform to the slots wherever they are positioned within the piston skirts. The constant inward pressure by spring 98 on wedge 84 cooperates with the tapered sides of wedge 84 in engaging piston slots of different widths so that the skirt of the piston will be kept perfectly cylindrical during the reaming operation. All of the various possible movements and adjustments of wedge 84 are required for its use with different types of slotted pistons. It is particularly important that the members supporting wedge 84 provide two horizontally hinged connections so that the wedge is enabled to squarely engage the slots at different elevations and inclinations. In the illustration given, the supporting members are allowed to pivot about pin 92 and pins 97. The supporting structure of wedge 84 can also be shifted longitudinally by sliding pins 87 within their recesses to adjust the wedge to slots at different distances from the crown of the piston. Many piston slots are not of uniform width throughout, and therefore provision is made for allowing one corner of wedge 84 to enter the slot more deeply by the pivoting of wedge 84 on pin 96. In the positioning of the wrist pin bearings 52 and 53 with respect to the reamer mandrel 33 it is important that guide means be employed which have sufficient bearing points to enable such positioning to be accurate to the highest degree. To bring about this result, I prefer to employ a hollow bushing or tapered collar 99, as illustrated more clearly in Figs. 2, 4, and 10 to 12. The bushing is of a diameter permitting it to make a firm sliding contact with the lower end portion 34 of the reamer shaft. The side walls of the tapered portion are preferably cut away to form oppositely disposed flattened portions 100. The bushing also includes a disk portion 101 to which is connected a guide pin 102. With the structure, there is provided a four-point contact between the tapered bushing 99 and the bearing 53 of the piston 48, as illustrated best in Figs. 10 and 11. The purpose of flattened portions 100 is to allow cooling oil to pass the bushing.

If desired, cooling liquid for the reaming operation can be supplied through a tube 103 from any suitable source of supply and supported for directing the fluid at the desired point on the work. Also, the valve of the fluid line and the switch for the motor 18 can both be controlled by a single pedal 104 located for operation by the foot of the operator, as illustrated in Fig. 1.

*Operation*

In the reaming of a piston, the operator places the piston against the block 66 with the top of the crown resting against shim 68. Wedge 84 is maneuvered to seat within the slot 49 of the piston, and thereby hold the skirt of the piston in cylindrical alignment. Handle 70 is then rotated to bring jaw 68 into loose engagement with piston 48 so that the piston will be supported by the clamping jaws while remaining rotatable with respect to the jaws. The reamer is then lowered by rotating wheel 25 to bring the lower portion 34 of the reamer mandrel into the position illustrated in Fig. 2. Bushing 99 which has been previously inserted on the lower end portion 34 is pushed upwardly on portion 34 and brought into engagement with the inside surface of bearing 53, as shown in Figs. 2 and 4. The motor 18 and the flow of oil is then started by foot pedal 104. While continuing to urge bushing 99 upwardly with the tips of the fingers of one hand to center the piston, the other hand of the operator is used to rotate wheel 25 to bring reamer 36 into contact with upper wrist pin bearing 52. Ordinarily, the reamer is initially lowered to about ⅛ inch within the bearing, which slightly depresses springs 78 and 79 so that the jaws 66 and 67 are caused to urge piston 48 upwardly against the rotating reamer 36. This upward pressure forces the reamer to begin the cutting of the oversize hole in direct alignment with the lower bearing.

The hinging of jaws 66 and 67 about the horizontal axis permits one or the other of the jaws to tilt below the normally centered positions for the centralizing adjustment of the piston. This is necessary because the reamer will first touch mainly on one side of bearing 52 which will set up a friction between the piston and the lower portion of the clamping block on the side of primary contact. Although the piston cannot shift on the face of the clamping block because of this established friction, the clamping block tilts downwardly and depresses the springs therebeneath while the piston shifts on the other clamping block where there is little friction established. Thus, the hinged and spring supported clamping blocks cooperate with the reamer in automatically bringing about a centralizing of the piston so that both bearings will be reamed with their central axis at right angles to the axis of the piston.

Immediately after lowering the reamer into the upper bearing and while continuing to hold bushing 99 in place, the operator rotates handle 70 to bring jaw 67 against the piston and thereby clamp the piston rigidly in position for completing the reaming operation. It will be noted that this final clamping creates a frictional bind between slots 73 in clamping block 66 and hinge rods 72 with the result that the piston is held solidly within work holder 54. During the entire reaming operation the thrust bearings within pedestals 56 supporting work holder 54 dampen the transfer of vibrations from horizontal bed 11 to work holder 54. Similarly, the universal joint provided by collar 42 and pin 45 limits the transfer of vibrations from spindle 22 to reamer 36. Thus, both the reamer and the work holder are allowed to float during the reaming operating with a minimum of vibration, while the cylinder is solidly held. This has the result of keeping the reamer sharp for greatly extended periods of use. In actual operation, it has been determined that the cutting edges of the reamers will stay sharp for at least ten times more reaming operations than previously.

The thrust bearings within pedestals 56 cooperate with reamer 36 in still another way when the reamer employed is of the segmented expansion type which has one cutting edge at a slightly greater radial distance from the central axis of the reamer. This cutting edge serves to direct the shifting of work holder 54 on its supporting thrust bearings so that perfectly round holes are produced.

To summarize, the following five features cooperate effectively to give perfect results: (1) floating of the reamer; (2) automatic wedge for slot in piston; (3) hinged V-jaws for clamping piston; (4) three point landing for jig providing floating action; and (5) guiding of the reamer extension in the bed of the machine. Eliminate any one of these five features, and less perfect results are obtained. When they are all employed a rod or piston goes through the machining operation and comes out with its bearings in perfect alignment.

While in the foregoing specification, I have set forth a specific structure in considerable detail for the purpose of illustrating an embodiment of my invention, it will be understood that many of the structural details can be varied widely by those skilled in the art without departing from the spirit of my invention.

I claim:

1. In a reamer apparatus of the character set forth, a frame providing a horizontal bed, a work holder supported on said bed by a plurality of thrust bearings adapted to permit lateral movement of said work holder in all directions with a minimum of friction, a spindle rotatably supported above said bed, a reamer vertically suspended from said spindle for rotation therewith, said reamer being equipped with cutting segments having spiral flutes providing cutting edges, one of said cutting edges lying at a slightly greater radial distance from the vertical axis of said reamer to serve as a guide in directing said work holder in its radial movements on said thrust bearings.

2. In a reamer apparatus of the character set forth, a frame providing a horizontal bed, a work holder supported on said bed by a plurality of thrust bearings which are adapted to permit radial movement of said work holder with a minimum of friction, a spindle rotatably supported above said bed and for movement toward and away from said bed, a reamer vertically suspended from said spindle for rotation therewith, said reamer being equipped with three cutting segments having spiral flutes providing cutting edges, one of said cutting edges lying at a slightly greater radial distance from the vertical axis of said reamer to serve as a guide in directing said work holder in its lateral movements on said thrust bearings.

3. In a reamer apparatus of the character set forth, a frame providing a horizontal bed, a work holding means resting on said bed, thrust bearings mounted between said bed and said work holding means being adapted to permit a lateral movement of said holder with respect to said bed, means for limiting the extent of said lateral movement, a spindle rotatably supported above said bed and for movement toward and away from said bed, a reamer vertically suspended from said spindle by means constraining said reamer to rotate with said spindle, said reamer being equipped with cutting segments having spiral flutes providing cutting edges, one of said cutting edges lying at a greater radial distance from the vertical axis of said reamer to serve as a guide in directing said work holder in its lateral movements on said thrust bearings.

4. The apparatus of claim 3 in which said work holding means is supported on three pedestals having said thrust bearings confined therein.

5. In a reaming apparatus having a horizontal bed and a reamer suspended thereabove for vertical movement toward and away from said bed during reaming operations, a piston holder for supporting on said bed a cylindrical piston equipped with wrist pin bearings, said holder having a vertical opening therethrough for receiving said piston and said reamer, said holder including a pair of notched clamping blocks facing said opening to support said piston with its axis horizontal and its wrist pin bearings in alignment with said reamer, hinge joint means supporting said clamping blocks for angular movement about substantially fixed horizontal axes running parallel to the axis of said piston and lying at a spaced distance above the bottom of said clamping blocks, compression spring means positioned beneath said blocks and supporting them in central angular positions on said hinge joint means while being compressible for the downward tilting of said clamping blocks, and means for forcing one of said clamping blocks toward the other to clamp said piston therebetween, whereby said clamping blocks can tilt below their central positions about substantially fixed horizontal axes to assist in centralizing a piston therebetween.

6. In a reaming apparatus having a horizontal bed and a reamer suspended thereabove for vertical movement toward and away from said bed during reaming operations, a piston holder for supporting on said bed a cylindrical piston equipped with wrist pin bearings, said holder having a vertical opening therethrough for receiving said piston and said reamer, the upper portion of said vertical opening being enlarged to provide horizontal shelves on each side of said opening and walls extending upwardly from the backs of said shelves, said holder including a pair of notched clamping blocks mounted thereon facing said opening to support said piston with its axis horizontal and its wrist pin bearings in alignment with said reamer, each of said clamping blocks being mounted with its bottom facing one of said shelves and its back facing the adjacent upwardly-extending wall, hinge joint means interconnecting the backs of said clamping blocks with said upwardly-extending walls and supporting said clamping blocks for angular movement about substantially-fixed horizontal axes running parallel to the axis of said piston and lying at a spaced distance above the bottoms of said blocks, compression spring means positioned beneath said blocks on said shelves and supporting said blocks in central angular positions on said hinge joint means and with the bottoms of said blocks at a spaced distance above said shelves, said compression spring means being compressible for the downward tilting of said blocks below said central angular positions, and means for forcing one of said clamping blocks towards the other to clamp said piston therebetween, whereby said clamping blocks can tilt below their central positions about substantially fixed horizontal axes to assist in centralizing a piston therebetween.

WILLIAM H. EVANS.

References Cited in the file of this patent

UNITED STATES PATENTS

| Number | Name | Date |
| --- | --- | --- |
| 1,405,306 | Martin | Jan. 31, 1922 |
| 2,188,205 | Osborne | Jan. 23, 1940 |
| 2,266,928 | Walker | Dec. 23, 1941 |